United States Patent [19]
DeSaro et al.

[11] Patent Number: 4,875,919
[45] Date of Patent: Oct. 24, 1989

[54] DIRECT CONTACT RAINING BED COUNTERFLOW CULLET PREHEATER AND METHOD FOR USING

[75] Inventors: Robert DeSaro, Acton; Edward F. Doyle, Dedham; Christopher I. Metcalfe, East Walpole; Keith D. Patch, Lexington, all of Mass.

[73] Assignee: Gas Research Institute, Chicago, Ill.

[21] Appl. No.: 180,989

[22] Filed: Apr. 13, 1988

[51] Int. Cl.⁴ ............................ C03B 3/00; C03B 5/00
[52] U.S. Cl. ........................................ 65/27; 65/134; 65/335
[58] Field of Search ................. 65/27, 134, 335, 135, 65/136

[56] References Cited
U.S. PATENT DOCUMENTS

| | | | |
|---|---|---|---|
| RE. 29,622 | 5/1978 | Lange | 65/27 |
| 2,615,703 | 10/1952 | Weber | 263/19 |
| 2,636,575 | 4/1953 | Watson | 183/114.2 |
| 2,702,091 | 5/1960 | Smith | 183/119 |
| 2,967,693 | 1/1961 | Cunningham et al. | 257/55 |
| 3,104,955 | 9/1963 | Marchand | 34/168 |
| 3,217,787 | 11/1965 | Preston | 65/1 |
| 3,953,190 | 4/1976 | Lange | 65/335 |
| 4,099,953 | 7/1978 | Rondeaux et al. | 65/335 |
| 4,185,984 | 1/1980 | Kiyonaga | 65/135 |
| 4,323,384 | 4/1982 | Meunier | 65/335 |
| 4,328,016 | 5/1982 | Hohman et al. | 65/2 |
| 4,330,313 | 5/1982 | Hohman et al. | 65/2 |
| 4,332,603 | 6/1982 | Hohman et al. | 65/27 |
| 4,349,367 | 9/1982 | Krumwiede | 65/27 |
| 4,350,512 | 9/1982 | Krumwiede | 65/27 |
| 4,353,725 | 10/1982 | Hohman et al. | 65/27 |
| 4,353,726 | 10/1982 | Rough, Sr. | 65/27 |
| 4,374,540 | 2/1983 | Massey et al. | 165/1 |
| 4,374,660 | 2/1983 | Sakhuja et al. | 65/335 |
| 4,582,521 | 4/1986 | Froberg | 65/27 |

Primary Examiner—Robert L. Lindsay
Attorney, Agent, or Firm—Lorusso & Loud

[57] ABSTRACT

An improved method and apparatus for preheating cullet used as feedstock for a glass furnace. A direct contact raining bed is described through which cullet is fed by gravity flow, with furnace flue gases as combustion products of a separately-fired heater passed in counterflow to heat the cullet by direct contact. The preheater includes deflectors to retard passage and increase the path length of cullet flowing through the raining bed, and the deflector plates are mounted at specific declination angles and have their geometric parameters selected to optimize cullet residence time. Glass furnace systems are described which include the raining bed cullet preheater in series and parallel flow relationships with a glass batch preheater.

17 Claims, 9 Drawing Sheets

DIRECT CONTACT RAINING BED COUNTERFLOW CULLET PREHEATER AND METHOD FOR USING

BACKGROUND OF THE INVENTION

This invention relates to glass manufacture, and in particular, to preheating of cullet utilized as a feedstock in a glass furnace.

Glass manufacturing is an energy-intensive process which requires about five-million Btu/ton for the melting process alone. As of the early 1980's, $300 \times 10^6$ million Btu were consumed annually by the glass industry in the United States, with natural gas providing 70% of this energy.

In a typical glass furnace, the heat supplied to the melt is provided predominantly by natural gas mixed with preheated combustion air. The resultant flame fires over the melt and heat transfer to the melt is by radiation from the flame and furnace enclosure.

Additionally, some furnaces augment the heat with an electric boost. The major attraction of an electric boost is that it allows an increase in production from an existing furnace by providing an additional heat source to the melt. Typically, for a container furnace (a glass furnace for manufacturing bottles), an equivalent of 1200 kW or more can be added directly into the glass furnace by boosting, which yields a production increase of 20%.

In addition to energy costs, another significant factor in glass manufacturing is the cost of the constituents which are melted to form the glass. In recent years, the glass industry has been able to reduce this part of the cost by supplementing the traditional glass batch constituents with recycled glass, commonly referred to as cullet. The cullet is obtained from sources such as recycled bottles, which are broken up into practical sizes for use as glass forming constituents.

A method of increasing the amount of heat that can be added to a furnace while avoiding the high operating cost of an electric boost is to preheat the feedstock - i.e. the glass batch constituents and cullet. Preheating of glass batch has been proven feasible experimentally. However, the benefit from only preheating batch components will proportionally diminish as cullet use increases. As a result, cullet preheating offers an important alternative to an electric boost. Furthermore, due to furnace economics and state legislation encouraging the recycling of scrap glass, cullet use will very likely increase in the near future to the point where it may be the predominant feedstock in container furnaces in many parts of the country.

At present, the maximum amount of glass that can be pulled from an existing furnace is limited by the amount of energy that can be put into the furnace to melt the feedstock. This limit is reached when the furnace is at high fire resulting in maximum flow of the products of combustion.

As indicated above, additional energy can be put into the furnace by preheating the cullet so as to provide a more productive and efficient glass manufacturing process. One suggested method of preheating cullet is to use packed bed heating. A substantial disadvantage of packed bed heating, however, is that the heating gas tends to carve out a path for itself through the bed of cullet which results in uneven temperature distribution. Also, high pressure drop across a packed cullet bed would necessitate use of a substantial amount of auxiliary power to direct gases through the cullet. In addition, a very high residence time is needed to heat the cullet to the desired temperature.

Fluidized beds have been proposed for preheating glass batch and cullet. However, while fluidized beds are effective in heating glass batch, they are not well suited for use with glass cullet. The main problem is that the cullet size and its size distribution can be very large and the high cost to grind the cullet down to a consistent, workable distribution for use in a fluidized bed makes the process unattractive.

The benefits to be accrued by preheating glass cullet prior to the melting process are clear. Using a cullet preheater, it is desirable to heat the cullet to a temperature just below that at which it begins to become sticky and agglomerates. Tests have shown that with preheater inlet gas temperature of 1650°°F., the cullet can be heated to 1100° F. which is ideal. For example, for a furnace running on feedstock which is 70% by weight cullet, preheating cullet to a temperature of about 1100° F. (a temperature just below that at which it begins to become sticky and agglomerates) can provide a productivity increase of as much as 30%.

In short, the glass industry is in need of a simple, cost-effective system, by which it can increase the productivity of furnaces by preheating its cullet feedstock prior to the melting process.

Therefore, it is an object of the present invention to provide a means by which existing glass furnaces can be made more productive and energy efficient.

A further object of the present invention is to overcome known production limitations of glass furnaces by delivering more energy to the furnace through cullet preheating.

Another object of the invention is to provide an improved method and apparatus for preheating cullet for use in a glass furnace.

Yet another object of the present invention is to provide a more energy efficient method for the manufacturing of glass which employs cullet as feedstock.

SUMMARY OF THE INVENTION

In accordance with the present invention, the above-noted problems of the prior art are overcome by a system which employs direct contact raining bed counterflow system to heat glass cullet prior to its use as feedstock in a glass melting operation. In the system of the present invention, unheated cullet is introduced at one end of a raining bed preheater while heated gas is introduced at the other end counter to the flow of the cullet. The cullet flows by gravity through the preheater, with its passage retarded by deflector plates of optimum geometry, and is heated by the counterflowing gases to a desired temperature. At the exit end, the cullet is delivered to the furnace in a preheated state. The system of the present invention provides very even heating distribution and is tolerant to a wide range of cullet size. Additionally, the present invention offers the further advantage of lower energy costs for the overall glass melting process because the cullet preheater has a higher thermal efficiency than does the furnace.

DESCRIPTION OF THE PREFERRED EMBODIMENTS

At the outset the invention is described in its broadest overall aspects with a more detailed description following. The broadest aspects of the invention include preheating the cullet in a direct contact raining bed counterflow heating chamber and immediately passing the preheated cullet to a furnace where it is mixed, for the forming of glass, with other glass forming constituents such as glass batch. The cullet can be preheated one of three ways. It can be heated by products of combustion of a separately fired heater, by utilizing flue gas from the glass melting furnace, or by a combination of both combustion and flue gas.

A key feature of the present invention is preheating glass cullet feedstock by a raining bed preheater as opposed to preheating it in a packed bed. In the raining bed preheater, constituents to be preheated (unheated cullet) are continually fed into the top of the heat exchanger chamber and, driven by the force of gravity, are allowed to fall through the preheater, counter to the flow of hot gases introduced at or near the bottom of the chamber. After falling through the chamber, the cullet is fed into the furnace or furnace feeder. It is important that the cullet arrive at the furnace while it is still hot. Thus, the preheater cullet outlet should be located as close to the furnace doghouse (feeder) as possible.

In accordance with the present invention, a deflector system of a specific, optimized geometry is mounted within the preheater so that the cullet does not fall in a straight line which would thereby reduce its exposure time to the hot combustion gases. As a result of these deflectors, the cullet, when fed into the top of the preheater, travels "zigzag" course designed to allow it a residence time sufficient for it to reach the desired temperature of about 1100° F. Also, the deflectors, by forcing the cullet to travel in a predetermined path, eliminate the possibility of hot gases by-passing the cullet. The features of the deflectors in accordance with the present invention are amplified below.

It is through the direct contact with the upwardly flowing combustion gases that the downwardly flowing, cold cullet becomes heated. The advantage to this heating over known packed bed preheating is that heat transfer from the combustion gases to the cullet is more evenly distributed with the counterflow method. In addition, the preheater functions with a low pressure drop, minimizing or avoiding the need for the auxiliary power to direct the counterflowing gases through the preheater.

Figure 1:
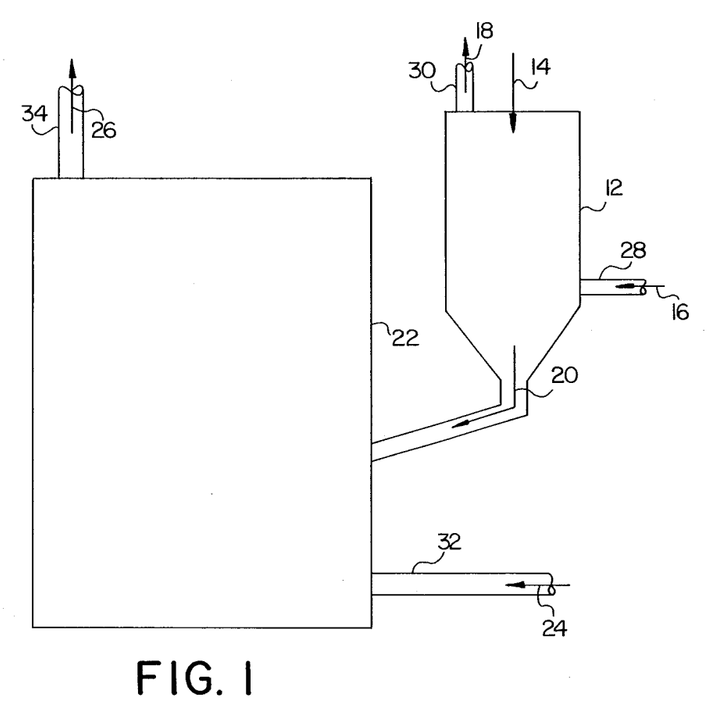
FIG. 1 is a diagrammatic view of a separately fired raining bed cullet preheater in line above a glass melting furnace in accordance with the present invention.

One important embodiment of the present invention is shown in FIG. 1 in which a cullet preheater 12 is located adjacent to a glass melting furnace 22. The cullet preheater 12, typically a vessel formed of stainless steel, preferably has a rectangular cross-section which facilitates construction and attachment of deflectors (FIGS. 7 and 8) and servicing of the preheater. Unheated cullet to be used as feedstock is fed into the preheater through inlets in the top (not shown) in the direction of arrow 14. Simultaneously, products of combustion (P.O.C.) of a separately fired burner are fed directly into the preheater through inlet 28 in the direction of arrow 16. The combustion gas exits through the top of the preheater through the exhaust outlet 30 in the direction of arrow 18 at a rate equivalent to that at which it enters into the preheater 12 from below. When the cullet reaches the bottom of the preheater it is hot and falls or is directed into the doghouse (not shown) and then fed into the furnace 22 in the direction of arrow 20. The furnace 22 is driven separately from the preheater 12 by products of combustion which enter the furnace 22 through an inlet port 32 in the direction of arrow 24 and exits at the same rate through a flue 34 in the direction of arrow 26.

Figure 2:
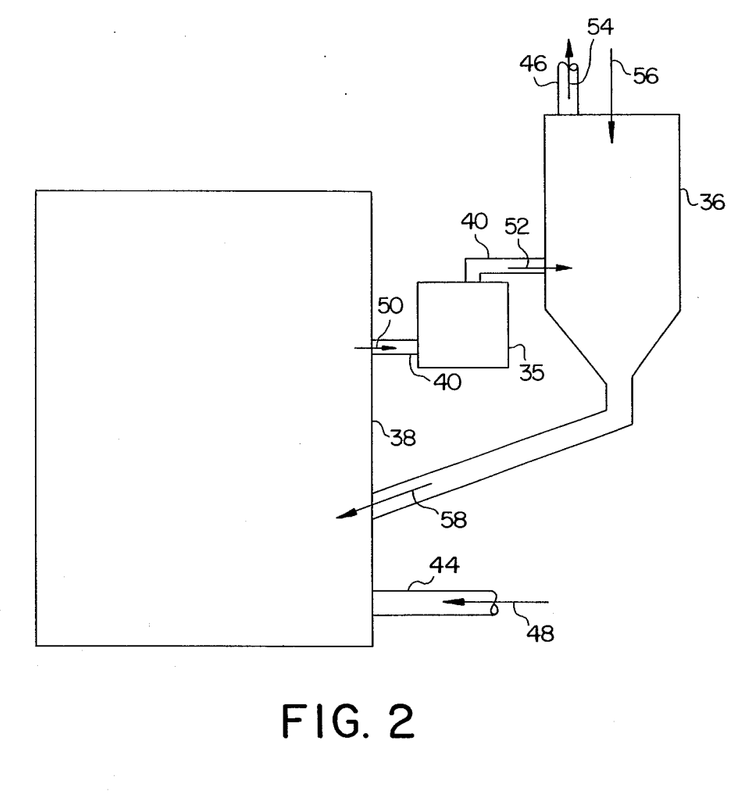
FIG. 2 is a diagrammatic view of an alternate form of the system of the present invention in which flue gas from a glass melting furnace is used to preheat cullet.

While the preferred embodiment of the present invention is a direct gas fired unit, alternative flue gas configurations are possible and may be superior under certain operating conditions. In one such possible alternative embodiment (FIG. 2), flue gas from the melting process is used to preheat the cullet, preferably after the flue gases have decreased in temperature by passage through a regenerator 35. The preheater 36 functions similarly to the preheater 12 in FIG. 1 except that hot gas which enters the preheater 36 in the direction of arrow 52 is flue gas from the glass melting furnace 38 which is drawn by natural draft through a furnace-preheater connector 40 rather than from a separate combustion gas source. The fan 42 is able to draw flue gas from the furnace 38 in the direction of arrow 50 and by so doing utilize energy to preheat the cullet that otherwise might have been wasted. Typical flue gas temperatures (after passage through a regenerator) are 1000° F. which can produce cullet preheat of about 700° F. Accordingly, in accordance with the present invention, depending on the preheater gas heating method, the cullet can be preheated to a temperature between about 700° F. and that at which it begins to agglomerate which is about 1150° F. In the system of FIG. 2 products of combustion gas are introduced to the glass melting furnace 38 in the direction of arrow 48 through inlet port 44 and, after passing through the glass melting furnace 38, the regenerator 35, and the preheater 36 are exhausted in the direction of arrow 54 through exhaust port 46 in the preheater 36.

Figure 3:
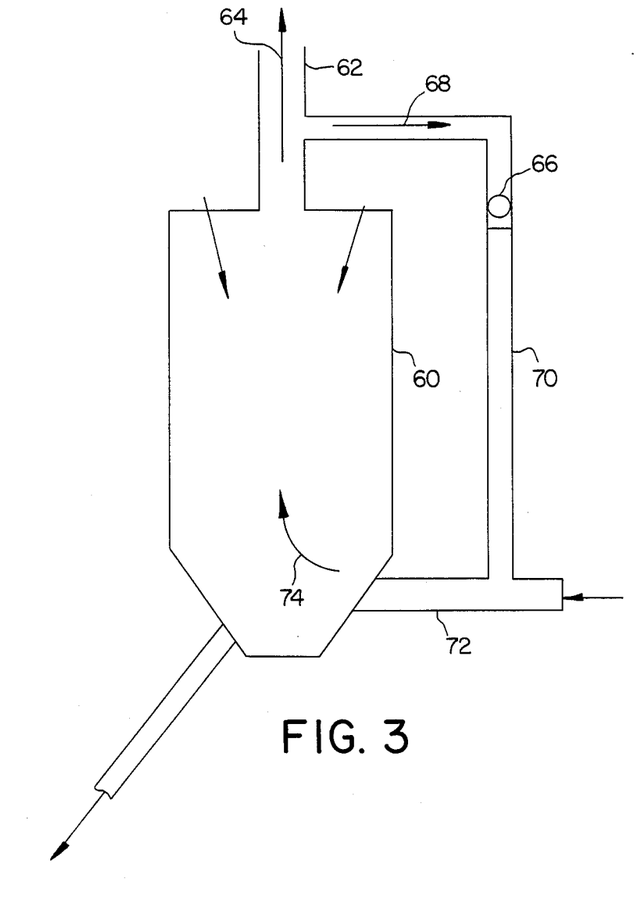
FIG. 3 is a diagrammatic view of an alternate form of the system of the present invention in which a portion of the preheater exhaust gas is recirculated.

Another energy conserving alternative embodiment of the present invention, illustrated in FIG. 3, includes a recirculator 70 on the preheater 60 to allow a portion of the preheater exhaust gas to rejoin with combustion gas at the bottom of the chamber. In this configuration, when the combustion gas has reached the top of the preheater 60 only part of it is exhausted in the direction of arrow 64 through exhaust port 62. A portion of the gas is drawn by a fan 66 in the direction of arrow 68 into the recirculation line 70 where it is mixed with combustion gas and fed through the inlet port 72 back into the preheater 60 in the direction of arrow 74. The system is able to reclaim energy that would otherwise have been wasted.

Figure 4:
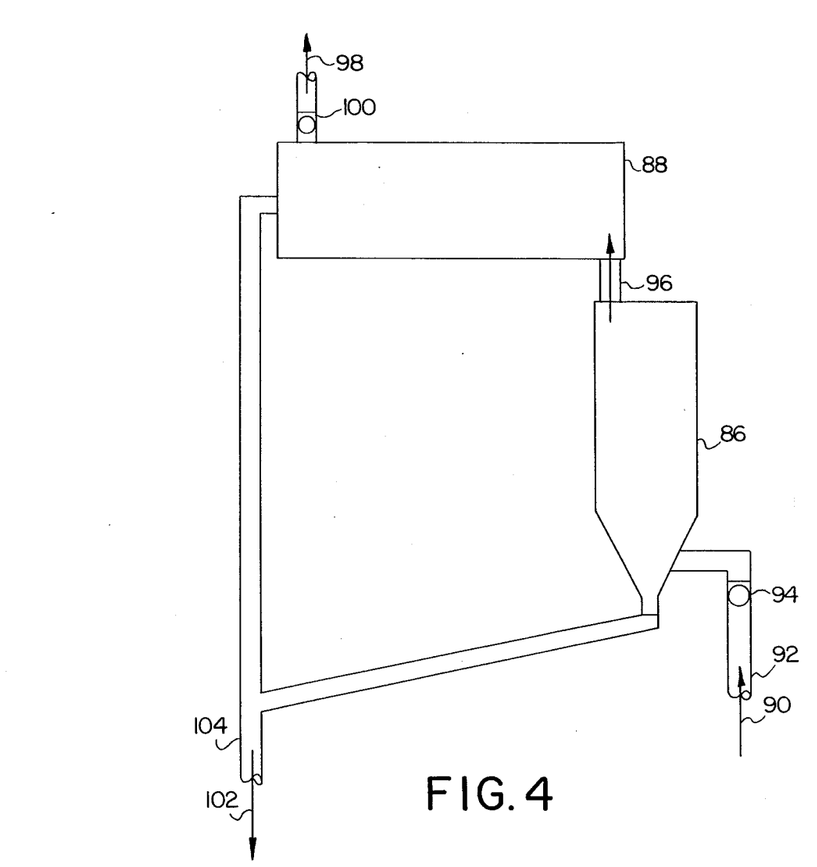
FIG. 4 is a diagrammatic view of an alternate form of the system of the present invention in which a cullet and a batch preheater are flue gas fired and are combined in series flow with the cullet preheater upstream of the batch preheater.
Figure 5:
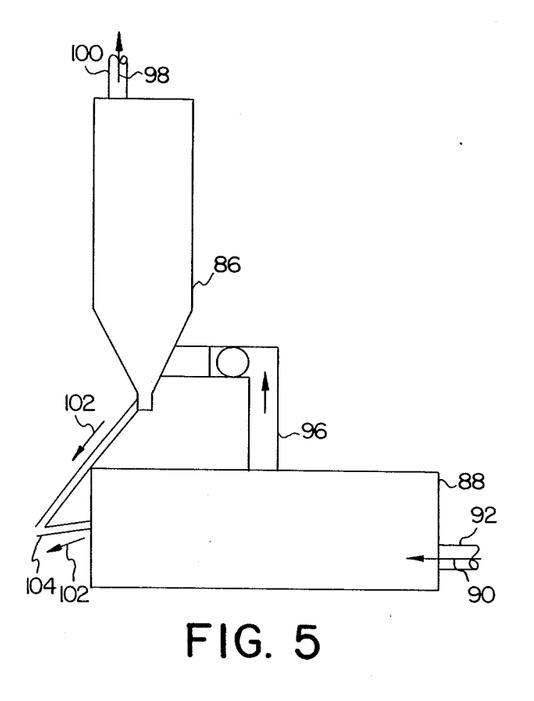
FIG. 5 is a diagrammatic view of an alternate form of the system of the present invention in which a cullet preheater and a batch preheater are flue gas fired and are combined in series flow with the cullet preheater downstream of the batch preheater.

Yet another approach within the scope of the present invention is a combined preheater system which includes a raining bed cullet preheater along with a glass batch preheater. The combined preheater system uses flue gases, rather than the combustion products of a fired heater. In a manner similar to that discussed in relation to FIG. 2, the flue gases of the glass melt are passed through the preheaters, with the cullet preheater 86 positioned upstream (FIG. 4), downstream (FIG. 5), or parallel to (FIG. 6), the glass batch preheater 88, depending on the specific process requirements. The glass batch preheater 88 of the systems of FIG. 4, FIG. 5, and FIG. 6 may, for example, be a fluidized bed glass batch preheater as disclosed in U.S. Pat. No. 4,374,660, the relevant teachings of which are incorporated herein by reference.

In the alternate embodiments with series flow (FIGS. 4 and 5) flue gas from a glass furnace (not shown) is drawn into the preheating system by a fan 94 through an intake port 92 in the direction of arrow 90. After passing through the first preheater the gas then travels through a connecting port 96 to the other preheater. After having passed through both preheaters the gas is then exhausted in the direction of arrow 98 through exhaust port 100. Simultaneously, preheated cullet from the preheater 86 and preheated batch from the preheater 88 are delivered to the furnace through a feeder 104 in the direction of arrow 102.

Figure 6:
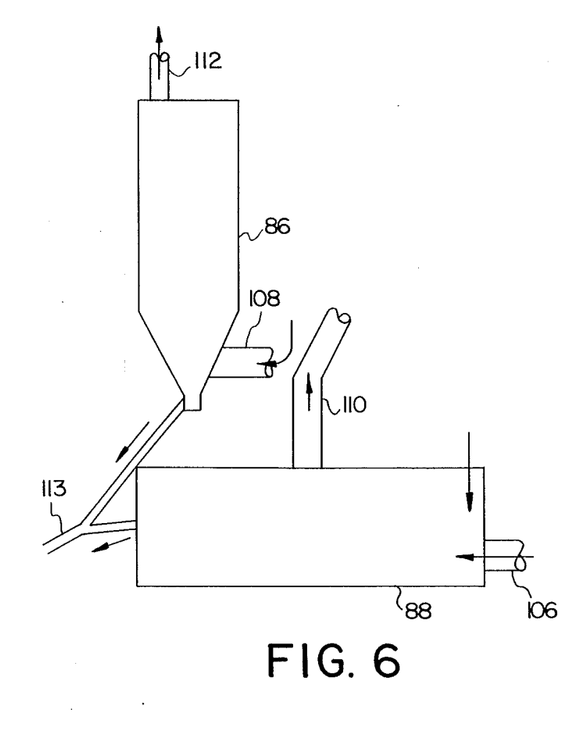
FIG. 6 is a diagrammatic view of an alternate form of the system of the present invention in which a cullet preheater and a batch preheater are flue gas fired and are in parallel flow.

The parallel flow embodiment (FIG. 6) functions very similarly to the series flow embodiments with the exception that each preheater is heated by a separate source of hot gas, either flue gases or combustion products of a separately fired heater. In FIG. 6, the batch preheater 88 has its own gas intake port 106 and its own exhaust port 110. Also, the cullet preheater 86 has its own gas intake port 108 and exhaust port 112. Preferably, the heated feedstock which is output from the preheaters of the FIG. 6 system is, like that of the series flow embodiments, combined and passed to the glass furnace through a feed line 113.

Figure 7:
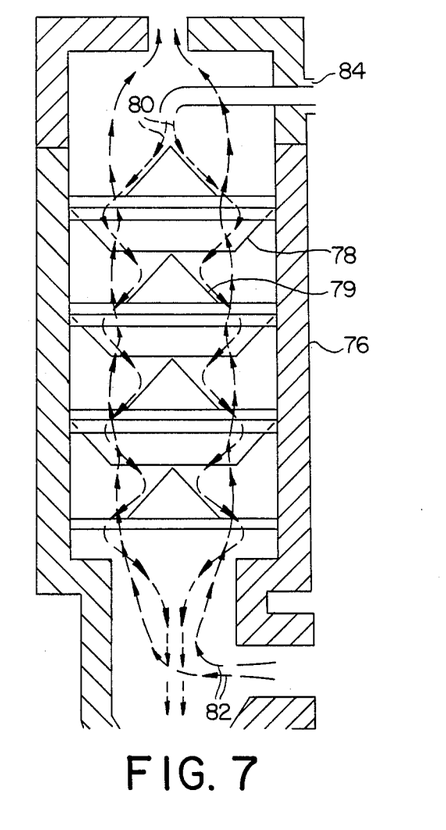
FIG. 7 is a cross-sectional view of a preheater according to the present invention which may be used in conjunction with a glass melting furnace.

As discussed above, the heating chamber 12 of FIG. 1 has, contained within it and shown in FIG. 7, a series of deflectors 78 intended to deter the loaded cullet from following a direct path which would produce too short a residence time in the chamber. (While residence time could be increased simply by building a taller preheater, this is usually not a practical solution due to resulting higher installed costs.) As a result, as shown in FIG. 7, when loaded into the heating chamber 76 the cullet will follow in the direction of the arrows 80, impact on a deflector 78 and either rebound or slide down until it drops onto the next lower, opposite deflector 79. By continuing to stop, or redirect, the flow of the cullet at spaced height intervals, the deflectors 78 are able to prevent the cullet from attaining its maximum, unimpeded velocity. Additionally, the average cullet particle's path though the device is longer because of the deflectors. Moreover, the deflectors force the cullet to travel in a predetermined path, thus eliminating the possibility of maldistribution or by-passing of the cullet. As a result, slower average velocity and longer path combine together to cause an increase in cullet residence time.

For the preferred embodiment of the present invention to function properly, it is imperative that the geometry and the material of the deflectors be precisely determined according to the specific application. Though the deflectors are intended to impede cullet flow, a high coefficient of friction between the cullet and deflector surface is not desirable. If gases of sufficiently high temperature are utilized in the direct contact preheater of the present invention, cullet temperatures can approach values at which the cullet becomes sticky. A deflector declination angle (shown as x in FIG. 8) that is too shallow coupled with a high coefficient of friction could result in the cullet adhering to the deflector surface which is highly undesirable. The resultant accumulation of sticky cullet on the deflectors would soon render the preheater inoperative. Materials like stainless steel with a 2B finish, smooth superalloy metals, smooth finish silicon carbide, or a fine grained refactory metal would discourage cullet adherence and are thus optimum for deflector construction.

Figure 8:
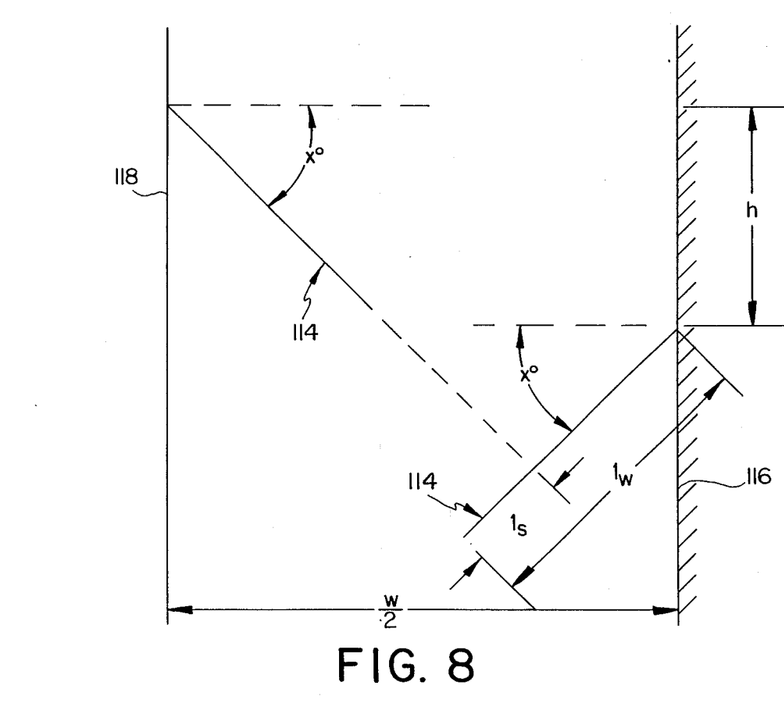
FIG. 8 is a diagrammatic view of the deflector geometry inside of a typical preheater in accordance with the present invention; and, FIG. 9 is a graphic representation of the relationship of the efficiency and effectiveness of a preheater according to the present invention as a function of a system's thermal capacity ratio.

While particle distribution size and gas velocity will generally dictate the cross sectional area of the preheater, the deflector geometry is determined with optimum particle flow and heat transfer in mind. The key parameters of that geometry appear in FIG. 8 and are spacing height, h, deflector width, $l_w$, and declination angle x (shown in FIG. 8), and % slide. FIG. 8 represents the deflector geometry for only one side of the preheater where two deflectors 114 are shown between the outside wall of the preheater 116 and the preheater center line 118, the deflector geometry on the other side of the preheater is simply the mirror image of that of FIG. 8. Based on FIG. 8, the % slide is determined by the equation:

$$\% \text{ slide} = (l_s/l_w) \times 100$$

where $l_s$ is the theoretical slide length.

Once the total system cross sectional area and gas flow rate are determined such that the bulk gas velocity (typically 2–12 fps) will only elutriate a tolerable amount of fine particles into the exhaust system, the deflector parameters can be selected. While the most effective heat transfer occurs when cullet is in the gas flow, some sliding on the deflector is needed to slow the particles' descent. An effective balance between these two concerns yields an appropriate deflector geometry. Design and laboratory experience have shown that declination angles between 20 degrees and 90 degrees, preferably between 30 degrees and 40 degrees; % slide between 20% and 90%, typically about 50%; deflector widths between 6 and 18 inches; and spacing heights between 6 and 18 inches are most appropriate for the preferred embodiment of the present invention.

Once all of the design parameters have been selected and the preheater is put into operation, its performance can be described by two, non-dimensional ratios: the effectiveness and the thermal efficiency. The effectiveness is defined as the ratio of the actual cullet temperature rise to the maximum temperature rise possible. It can be represented by the following equation:

$$\text{Effectiveness} = \frac{T_c - T_a}{T_g - T_a}$$

where:
$T_c$ = cullet preheated temperature
$T_a$ = cullet ambient temperature
$T_g$ = inlet gas temperature For a given inlet gas temperature, the cullet preheat temperature will increase as the effectiveness increases. The effectiveness becomes one when the preheat cullet temperature and the inlet gas temperature are the same.

The other measure of preheater performance, the thermal efficiency, is the ratio of the amount of energy that goes into the preheater to the amount of energy that goes into the cullet (as opposed to going up the preheater exhaust or through the preheater walls). Effectiveness and efficiency are inversely proportional to one another which is to say that as the former increases the latter decreases and vice-versa. The goal of the designer is to determine the preheater cross-sectional area, the deflector geometry and the combustion gas and cullet flow characteristics that will optimize both values or, in the alternative, establish a design that will yield an acceptable value for each.

Figure 9:
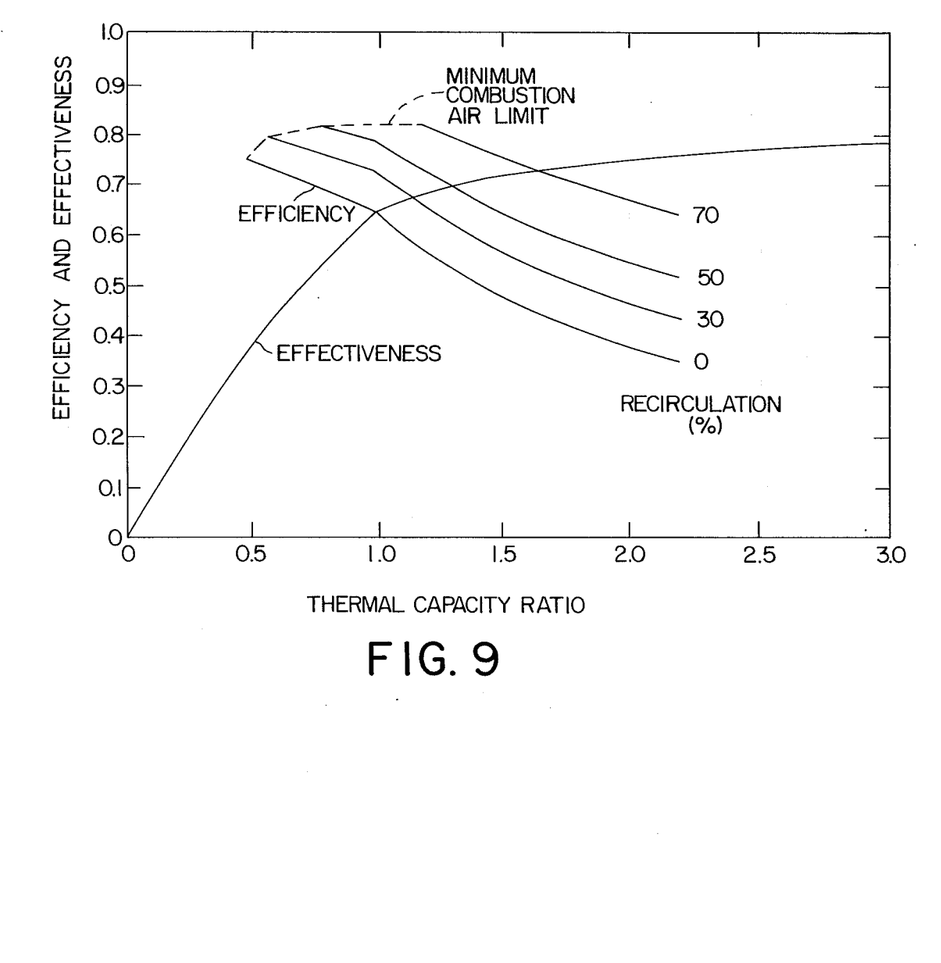

FIG. 9 depicts the theoretical relationship of efficiency and effectiveness as a function of the thermal capacity ratio (TCR) which is the ratio of the gas mass flow rate times the specific heat of the gas to the cullet mass flow rate times the specific heat of the cullet. In the Figure, values for efficiency and effectiveness are projected along the Y-axis and values for the thermal capacity ratio are projected along the X-axis. Since the specific heats of the gas and the cullet are approximately equivalent, the thermal capacity ratio essentially describes the relationship of the gas flow rate to the cullet flow rate.

In FIG. 9, the efficiency is shown for four values of gas recirculation and clearly shows that at a fixed gas flow rate the efficiency of the system can be increased by recirculating a portion of the preheater exhaust gas back to the preheater inlet. As shown in FIG. 9, by increasing the recirculation rate from 30% to 50% the thermal efficiency can be increased from 0.7 to 0.78 at a thermal capacity ratio of 1.0. However, to go much beyond 50% recirculation it would be necessary to increase the total gas flow in order to maintain the desired inlet gas temperature. The result would be a TCR of greater than one which, as will be discussed below, is not desirable. Also, increasing the recirculation to greater than 50% results in relatively small efficiency gains. Accordingly, the ideal recirculation rate is about 50%.

FIG. 9 also clearly demonstrates that with no gas recirculation, a TCR of one yields an effectiveness and efficiency both equal to 0.65. While for a given cullet flow rate, the efficiency could be increased and the preheater size reduced by decreasing the gas flow rate (which would reduce the TCR), FIG. 9 points out that due to the sharp slope of the effectiveness curve at this point, such a modification would result in seriously decreased cullet preheat temperature. As a result, a TCR of less than one is not recommended.

Alternatively, while increasing the TCR by increasing the gas flow rate would result in higher effectiveness, it is clear when reviewing FIG. 9 that the shallow effectiveness slope in this area indicates that the resultant rise in cullet preheat temperature would be proportionately small. The designer must also be cognizant of the fact that at higher gas flow rates efficiency goes down and preheater cross-sectional area increases. As a result, it is apparent that a TCR of greater than one is not recommended either. The conclusion therefore, is that a TCR of as close to one as possible is ideal.

The invention is further described by the following, non-limiting, example. With reference to FIG. 1 and FIG. 8, a preheater 12 is provided with a "half-width", w/2, of 20 inches. Deflectors in the preheater 12 are mounted at a declination angle x of 35 degrees and have a width $l_w$ of 9¼ inches, a spacing height h of 5⅝ inches, and a % slide of 47.3. Combustion gas at a temperature of 1650° F. and a flow rate of 54,000 ft³/hour is introduced into the preheater 12 in the direction of arrow 16 through inlet port 28. At the same time, unheated cullet of particle sizes ranging from 0.003 inches to several inches is introduced into an opening (not shown) in the preheater at a rate of 2.5 tons/hour while exhaust gas flows out of the preheater 12 in the direction of arrow 18 through exhaust port 30 at a rate of 54,000 ft³/hour. The cullet falls through the preheater 12 over a period of about 4 seconds during which it reaches a temperature of approximately 1100°F. Upon leaving the preheater 12 the cullet is fed into the furnace 22 where it is mixed with other glass forming constituents such as batch made of compounds including $Na_2CO_3$, $CaCO_3$, and $SiO_2$. The temperature inside of the furnace is generally between 2600° F. and 2900° F. depending on the specific type of glass being produced at the time. Depending on the production requirements of the operation, glass forming constituents are fed into the furnace at a rate about fifteen percent greater than that at which molten glass is removed for the forming of suitable products such as bottles. Generally, a "pool" of molten glass of about 5¼ feet deep is left in the furnace at all times. As discussed earlier, the furnace is fired primarily by combustion gas which enters in the direction of arrow 24 through inlet port 32 at a rate typically about 882,000 ft³/hour and exits in the direction of arrow 26 through exhaust port 34 at the same rate.

While the preheater has been described with reference to preheating cullet, it may also be suitable for preheating of glass batch materials. For such applications it may be necessary to pelletize the glass batch or to form it into briquettes prior to its introduction into the preheater.

The invention may be embodied in other specific forms without departing from the spirit or essential characteristics thereof. The present embodiments are, therefore, to be considered in all respects as illustrative and not restrictive, the scope of the invention being indicated by the claims rather than by the foregoing description and all changes which come within the meaning and range of equivalency of the claims are therefore intended to be embraced therein.

What is claimed is:
1. A method of preheating cullet for use in a glass furnace comprising:
  (a) introducing cullet into a preheater near the top thereof;
  (b) allowing glass cullet to fall downward through the preheater to form a raining bed while hot gases are introduced near the bottom of the preheater and allowed to flow upward to directly contact the cullet to thereby heat the cullet to temperature below the agglomeration temperature of said cullet but above 700° F.;

(c) controlling the residence time of the cullet in the preheater by deterring the cullet's fall through the preheater with a series of deflectors arranged within the preheater; and (d) introducing the heated cullet into a furnace containing molten glass.

2. The method as set forth in claim 1 wherein the cullet is heated by direct firing combustion gas and introducing the combustion products into the preheater counter to the flow of the cullet.

3. The method as set forth in claim 1 wherein the cullet is heated by introducing flue gas from the furnace into the preheater counter to the flow of the cullet.

4. The method as set forth in claim 1 wherein the cullet is heated by introducing a combination of combustion products of a separately-fired heater and furnace flue gas into the preheater counter to the flow of the cullet.

5. The method as set forth in claim 1 wherein the cullet is heated by recirculating preheater exhaust gas and introducing the exhaust gas into the preheater along with combustion products of a separately-fired heater.

6. The method as set forth in claim 5 wherein the recirculation gas is about fifty percent of the preheater exhaust gas.

7. The method as set forth in claim 1 wherein the cullet is heated by direct contact with the heated gas introduced into the preheater counter to the flow of the cullet.

8. The method as in claim 1 wherein the cullet preheater operates in series with a batch preheater, is fueled by a combination of flue gas from the glass melting furnace and combustion products of a separately-fired heater, and is upstream in relation to the flow of that gas to the batch preheater.

9. The method as in claim 1 wherein the cullet preheater operates in series flow with a batch preheater, is fueled by a combination of flue gas from the glass melting furnace and combustion products of a separately-fired heater, and is downstream in relation to the flow of said combustion products to the batch preheater.

10. The method as in claim 1 wherein the cullet preheater operates in parallel flow with batch preheater and is fueled by a combination of flue gas from the glass melting furnace and combustion products of a separately-fired heater.

11. The method as set forth in claim 1 wherein in step (a) the cullet is introduced into a preheater having deflectors within designed to retard the passage of cullet traveling from the top of the preheater to the bottom in order to provide residence time in the preheater sufficient for the cullet to reach a desired temperature.

12. The method as set forth in claim 1 wherein the cullet is continually fed into the preheater to create a raining bed.

13. A furnace system comprising:
a furnace for melting constituents for forming glass;
a preheater in communication with said furnace, said preheater including an inlet port for the introduction of said unheated material, an inlet port for the introduction of heated gas and positioned to allow heated gas to flow counter to the flow of said material, and a series of deflectors designed to impede the flow by gravity of said material down through the preheater in order to produce a residence time sufficient for the material to attain a desired preheat temperature; said series of deflectors arranged so that each deflector is inclined to thereby have a vertical and a horizontal component and an upper and a lower edge, said deflectors being sized and arranged so that the combined horizontal components of any two opposed successive deflectors is smaller than the horizontal distance between the upper edges of the two opposed successive deflectors; and
means for introducing into said furnace heated material exiting the preheater.

14. The furnace system of claim 13 including a series of deflectors mounted within said preheater, said deflectors having a declination angle with respect to horizontal of between 20 degrees and 90 degrees.

15. The furnace system of claim 14 wherein said deflectors have a declination angle of between 30 degrees and 40 degrees.

16. The furnace system of claim 14 wherein each of said deflectors is separated from the next successive deflector by a spacing height of between 6 inches and 18 inches.

17. The method as set forth in claim 1 wherein said deflectors are arranged to be inclined to thereby have vertical and horizontal components and upper and lower edges, said deflectors being sized and arranged so that the combined horizontal components of any two opposed successive deflectors is smaller than the horizontal distance between the upper edges of the two opposed successive deflectors.

* * * * *